March 31, 1931.	K. E. LYMAN	1,798,213
NOZZLE FOR LUBRICATORS
Filed Jan. 11, 1923
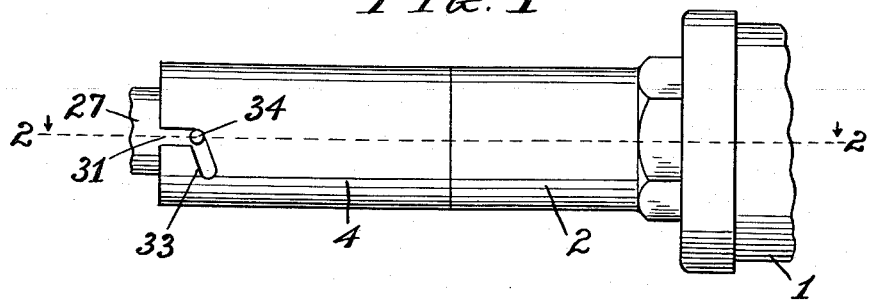
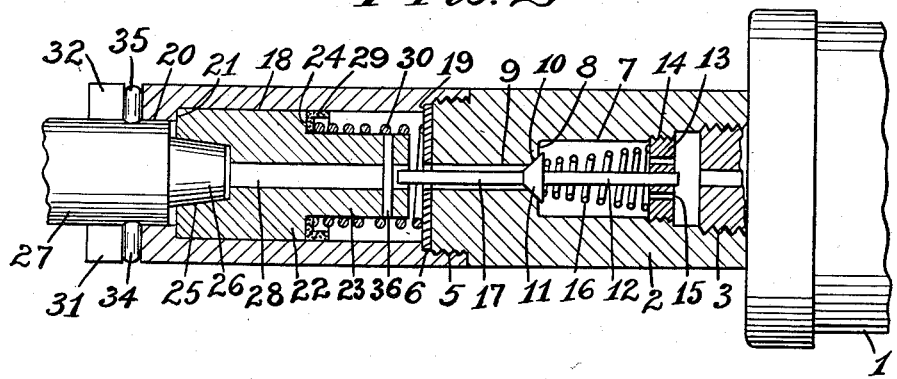
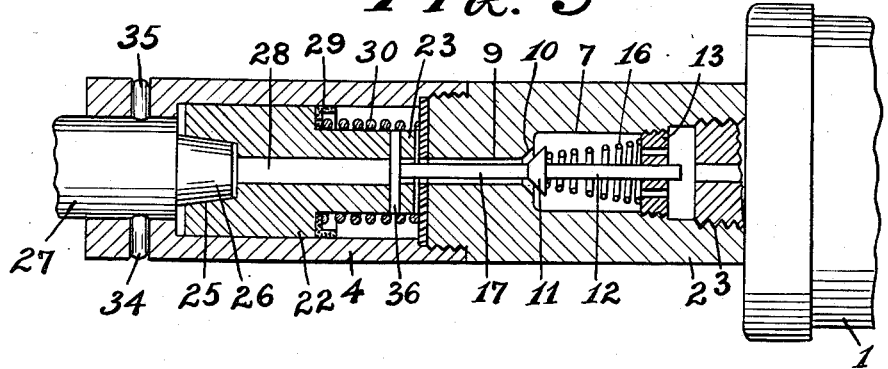
Inventor
Kent E. Lyman
By G. E. Dunstan,
his Attorney Patented Mar. 31, 1931

1,798,213

UNITED STATES PATENT OFFICE

KENT E. LYMAN, OF CLEVELAND, OHIO; THE GUARDIAN TRUST COMPANY EXECUTOR OF SAID KENT E. LYMAN, DECEASED

NOZZLE FOR LUBRICATORS

Application filed January 11, 1923. Serial No. 612,092.

This invention relates to nozzles for high pressure lubricators, and has for its main object to provide a nozzle which is adapted to be quickly attached to and detached from a receptacle connected with a part to be lubricated and will automatically open just after attachment and close just before detachment.

A further object of the invention is to provide a nozzle for high pressure lubricators of said character, which is of simple and practical construction, and is reliable to prevent leakage of the lubricant when the lubricator is being attached or detached from the part to be lubricated.

For a clear understanding of the invention reference will be had to the accompanying drawings illustrating the same, and the novel features thereof will be particularly pointed out in the appended claims.

In the drawings, similar characters of reference are used to indicate corresponding parts.

Figure 1 is a side view of a nozzle constructed in accordance with my invention, the nozzle being in position for attachment to a receptacle.

Fig. 2 is an enlarged sectional view taken on line 2—2 of Figure 1, the valve being in its closed position, and Fig. 3 is a similar view to Fig. 2 after the nozzle has been attached to the receptacle, the valve being in its open position.

Referring to the drawings, 1 represents a lubricator for high pressure lubrication, and fixed thereto is a nozzle constructed in accordance with my invention for quickly attaching to and detaching from a part to be lubricated. Said nozzle consists of a cylindrical body 2 which is fixed to the lubricator at 3, and a sleeve 4 is fixed to the forward end of said cylindrical body at 5. A suitable washer 6 is arranged to prevent leakage at the joint 5. Said cylindrical body is provided with a bore 7 and extending from the end 8 thereof is a central opening 9. A seat 10 is provided at the end 8 for a shut-off valve 11 having a stem 12, which is slidably mounted in a guide 13 fixed in the bore 7 at 14. The guide 13 is provided with a plurality of inlet openings 15, and a suitable coiled tapering spring 16 encircling said stem and interposed between said guide and the valve 11 tends to hold said valve in engagement with its seat. A rod 17 of less diameter than the opening 9 extends from the valve 11 through said opening and projects beyond same.

The inside bore of the sleeve 4 is reduced at 18 leaving an annular shoulder 19, and is further reduced at 20 leaving a shoulder at 21. Slidably mounted in the reduced diameter 18 of the sleeve is a member 22 having a reduced neck 23 at its inner or rear end leaving an annular shoulder at 24, and its other end is provided with a tapering recess 25 for fitting a correspondingly tapering end 26 of a receptacle 27 of a part to be lubricated. The member 22 is provided with a central opening 28 extending from the recess 25 and of the same diameter and in longitudinal alignment with the opening 9 of the cylindrical body 2. A suitable washer 29 is arranged upon the neck 23 and against the shoulder 24 to prevent leakage at this point, and a suitable coiled spring 30 encircles said neck and interposed between the washers 29 and 6 tends to force a member 22 forwardly against the shoulder 21.

For the purpose of attaching the forward end of the sleeve 4 to the receptacle 27, and upon attachment to open the shut-off valve 11, said sleeve is provided with bayonet slots at 31 and 32 having suitable inclined or angular portions as indicated at 33 for engaging pins 34 and 35 extending laterally from said receptacle to force said sleeve and the body 2 to which it is fixed forwardly, and a pin 36 is arranged in the neck 23 of the member 22 and across the opening 28 for the purpose of being engaged by the end of the rod 17 as said sleeve and body are forced forwardly to cause said shut-off valve to open. The action of said inclined portions of the bayonet slots upon the pins 34 and 35 by forcing the recess 25 of the member 22 upon the tapering end 26 against the action of the coiled spring 30 seals the joint between same. In order that the shut-off valve 11 will not be opened until after the sealing of the joint between the end 26 and the side of the recess 25 of the member 22, the cross pin 36 is normally out of engagement with and the proper distance from the end of the rod 17 of said valve to permit a slight rearward movement of said member before said cross pin engages the end of said rod. By turning the lubricator to the right when the bayonet slots 31 and 32 are in engagement with the pins 34 and 35, attachment will be effected, the joint between the end 26 and the recess 25 of the member 22 will be sealed, and then the cross pin 36 will be engaged by the end of the rod 17 for opening the shut-off valve 11, thus permitting the lubricant to pass from the lubricator 1 to the receptacle 27. To detach the lubricator, it is turned to the left, thereby the sleeve 4 and the body 2 will move rearwardly and the shut-off valve 11 will close before the seal is broken between the end 26 and the recess 25 of said member.

It will be seen that a nozzle for lubricators constructed as disclosed, will be sealed at the joint automatically as it is being attached to a part to be lubricated and opened after being sealed, and that it will be automatically closed when it is being detached just before the seal at said joint is broken. Although the construction shown and described is capable of accomplishing the purpose for which it is intended, it is to be understood that slight changes in the details of construction may be made within the scope of the claims.

Having fully described my invention, what I claim is:

1. In a nozzle for lubricators, the combination of a body, a member slidably mounted in the body, means adapted to force the member forwardly, means for moving the body to cause a part to be lubricated to be engaged by said member for making a sealed joint between said part and said member, a valve seated in the body, means tending to hold the valve against its seat, and means whereby said body is permitted to move while said member is in sealed engagement with said part before said valve will be moved from its seat, substantially as described.

2. In a nozzle for lubricators, the combination of a body, a member slidably mounted in the body, means adapted to force the member forwardly, a valve seated in the body, a spring at the rear side of the valve tending to hold the valve against its seat, a rod extending from the forward side of the valve, and the rod being normally out of engagement with said member and being adapted to be engaged by said member after the sealing of said joint whereby the valve will be forced from its seat by the continued movement of said body, substantially as described.

3. In a nozzle for lubricators, the combination of a body, a member slidably mounted in the body, means adapted to force the member forwardly, means for moving the body to cause a part to be lubricated to be engaged by said member for making a sealed joint between said part and said member, a valve seated in the body, means tending to hold the valve against its seat, and said member and said valve being in spaced and not integral relation whereby the continued movement of said body after the sealed engagement of said member with said part will cause said valve to be forced away from its seat, substantially as described.

4. In a nozzle for lubricators, the combination of a body, the body having a bore at its rear end and an opening extending forwardly therefrom, a valve within the bore and seated at said opening, a spring tending to force the valve against its seat, a member slidably mounted in the body forwardly of and separated from the valve, a second spring adapted to force the member forwardly, and means for forcing the body forwardly to cause said member to engage a part to be lubricated for making a sealed joint between said part and said member and thereafter to cause said valve to be forced from its seat, substantially as described.

5. In a nozzle for lubricators, the combination of a body, a member slidably mounted in the body, means adapted to force the member forwardly, the body being provided with bayonet slots for engaging pins of a part to be lubricated, the bayonet slots having inclined portions for acting upon said pins to force the body forwardly to cause the part to be lubricated to be engaged by said member for making a sealed joint between said part and said member, a valve seated in the body, a spring at the rear side of the valve tending to hold the valve against its seat, a rod extending from the forward side of the valve, and said rod being adapted to engage said member on continued movement of said body after the sealing of the joint between said part and said member to cause said valve to be forced from its seat, substantially as described.

6. In a nozzle for lubricators, the combination of a body, the body having a bore at its rear end and an opening extending forwardly therefrom, a valve seat at the opening, a spring tending to force the valve against its seat, a rod extending forwardly from the valve, a member slidably mounted in the body, the member having a neck and an annular shoulder, a coiled spring encircling the neck for engaging said shoulder tending to force said member forwardly, means for drawing the body forwardly to cause a part to be lubricated to be engaged by said member for making a sealed joint between said part and said member, and said member being adapted to be engaged by said rod after the sealing of said joint to force the valve from its seat, substantially as described.

7. A lubricant compressor comprising a barrel having a discharge conduit, the outer end of which is provided with a valve seat, an inwardly opening valve co-acting with said valve seat to prevent the discharge of lubricant from said discharge conduit, a sealing member movably mounted in said discharge conduit outwardly beyond said valve, and lost motion connecting means between said sealing member and said valve.

8. In a structure of the character described, the combination with a discharge conduit having a valve seat therein, of a valve for co-acting with said seat, a spring for holding said valve closed on said seat, a sealing member slidably mounted in said conduit, a second spring for biasing said sealing member away from said valve, and means forming a lost motion connection between said sealing member and said valve, said conduit being provided adjacent said sealing member with an inclined slot.

9. In a structure of the character described, the combination with a discharge conduit and a valve seat, of a valve for coacting with said seat, a spring for holding said valve closed on said seat, a sealing member slidably mounted in said conduit, a second spring for biasing said sealing member away from said valve, and means forming a lost motion connection between said sealing member and said valve.

10. The combination with a discharge conduit provided at one end with means for making a quick detachable connection with a lubricant receiving device, of a sealing device slidably mounted in said conduit, a spring for biasing said sealing device toward said first named means, a valve seat in said conduit, a valve for coacting with said seat, and means for opening said valve after said sealing device has been moved toward said valve seat, said spring having one end abutting against said valve seat.

In testimony whereof I affix my signature.

KENT E. LYMAN.